(12) United States Patent
deLeon et al.

(10) Patent No.: US 7,504,131 B2
(45) Date of Patent: Mar. 17, 2009

(54) METHOD OF MAKING ELECTRO-CONDUCTIVE SUBSTRATES

(75) Inventors: Sergio Diaz deLeon, Huntersville, NC (US); Nick Carter, Hutchinson, KS (US)

(73) Assignee: PGI Polymer, Inc., Charlotte, NC (US)

( * ) Notice: Subject to any disclaimer, the term of this patent is extended or adjusted under 35 U.S.C. 154(b) by 730 days.

(21) Appl. No.: 11/104,224

(22) Filed: Apr. 12, 2005

(65) Prior Publication Data

US 2005/0269736 A1 Dec. 8, 2005

Related U.S. Application Data

(60) Provisional application No. 60/561,312, filed on Apr. 12, 2004.

(51) Int. Cl.
*B05D 5/00* (2006.01)
*D02J 3/18* (2006.01)
*D02G 3/00* (2006.01)

(52) U.S. Cl. .................. 427/243; 428/372; 428/364; 428/394; 264/103; 264/104; 264/211

(58) Field of Classification Search .............. 427/243; 118/623
See application file for complete search history.

(56) References Cited

U.S. PATENT DOCUMENTS

| | | | |
|---|---|---|---|
| 3,338,992 A | 8/1967 | Kinney | |
| 4,041,203 A | 8/1977 | Brock et al. | |
| 4,145,467 A * | 3/1979 | Malik | 428/91 |
| 4,196,805 A | 4/1980 | Banno | |
| 4,431,598 A * | 2/1984 | Korpman | 264/40.7 |
| 4,626,278 A * | 12/1986 | Kenney et al. | 75/338 |
| 4,681,215 A | 7/1987 | Martin | |
| 4,793,459 A | 12/1988 | Forknall et al. | |
| 4,812,267 A | 3/1989 | Hoffmann et al. | |
| 4,903,820 A | 2/1990 | Fyfe | |
| 5,225,018 A | 7/1993 | Zeldin et al. | |
| 5,294,242 A | 3/1994 | Zurecki et al. | |
| 5,388,175 A * | 2/1995 | Clarke | 385/100 |
| 5,645,155 A | 7/1997 | Houghton | |
| 5,679,379 A * | 10/1997 | Fabbricante et al. | 425/7 |
| 5,783,503 A | 7/1998 | Gillespie et al. | |
| 6,003,656 A | 12/1999 | Fortenbery | |
| 6,053,298 A | 4/2000 | Nimmo et al. | |
| 6,112,875 A | 9/2000 | Gibson | |
| 6,114,017 A | 9/2000 | Fabbricante et al. | |
| 6,161,673 A | 12/2000 | Nimmo et al. | |

(Continued)

*Primary Examiner*—Michael Kornakov
*Assistant Examiner*—Alexander Weddle
(74) *Attorney, Agent, or Firm*—Kilyk & Bowersok, P.L.L.C.; Valerie Calloway

(57) ABSTRACT

The electro-conductive substrate of the present invention may comprise filaments extruded from a die orifice and at least one metal powder dispensed from a second orifice of the same die unit by way of a gas or liquid carrier. As the polymeric filament is extruded from the die, one or more metal powders may be simultaneously dispensed to coat the surface of the filament. As the polymeric melt and metal powder is extruded, air pressure is impinged upon the metal powder directing the powder toward the extruded filament. The metal powder adheres to the molten polymer as it is extruded for the die, coating the surface of the filament. The metal powder may also be incorporated into the polymeric melt prior to extrusion.

16 Claims, 2 Drawing Sheets

U.S. PATENT DOCUMENTS

| | | | |
|---|---|---|---|
| 6,162,535 A * | 12/2000 | Turkevich et al. | 428/372 |
| 6,454,077 B2 | 9/2002 | Nimmo et al. | |
| 6,702,091 B2 | 3/2004 | Nimmo et al. | |
| 2005/0003035 A1 * | 1/2005 | Zucker et al. | 425/131.5 |
| 2005/0025964 A1 * | 2/2005 | Fairbanks et al. | 428/364 |
| 2005/0247545 A1 | 11/2005 | Ni et al. | |

* cited by examiner

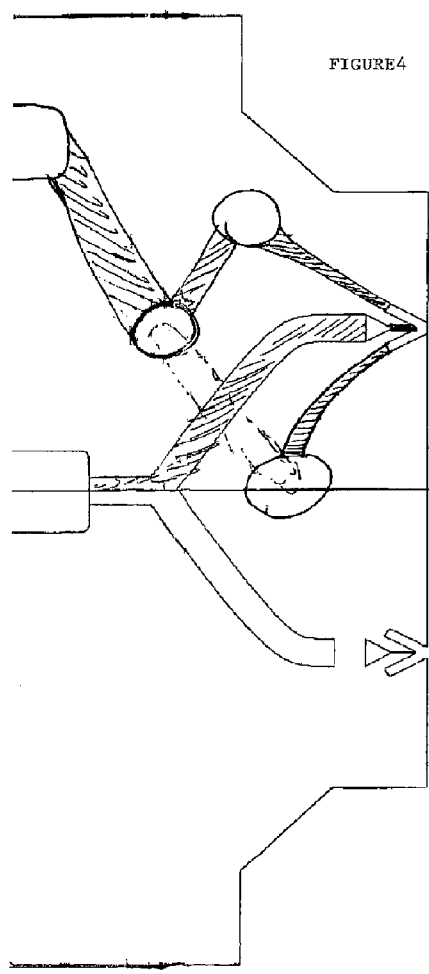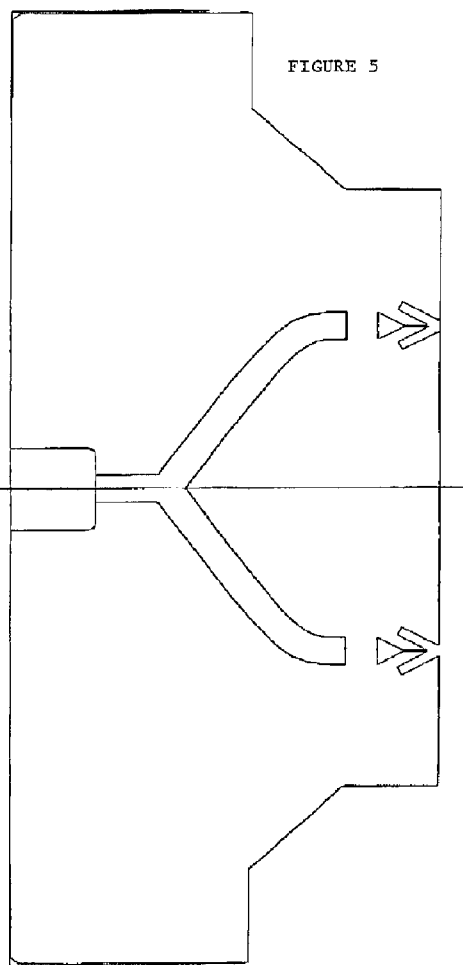

METHOD OF MAKING ELECTRO-CONDUCTIVE SUBSTRATES

TECHNICAL FIELD

The present invention generally relates to electro-conductive substrates, and more specifically to a method of continuously extruding electro-conductive filaments and film comprising at least one metal powder, and the products thereof.

BACKGROUND OF THE INVENTION

Electro-conductive fabrics are often used where there is a need for an anti-static performance. Areas that house electronic equipment, including computer manufacturing or storage facilities, information technology rooms, and electronic media rooms are deleteriously affected in the presence of static electricity. For this reason, fabrics introduced to these areas are often fabrics comprised of electro-conductive fibers or treated with an electro-conductive chemistry.

For optimal performance, the electro-conductive material is located on or near the surface of the filament or fiber. Attempts have been made in the past to manufacture electro-conductive filaments or fibers, wherein the conductive material is added to an aqueous solution that may include a binder that is topically applied by either spraying or padding the solution onto the filament; however a topical application adds an extra step to the manufacturing process, while the use of binders adds to cost of the process. Still other methods involve the use of hollow fibers filled with one or more conductive materials or the core of a bi-component fiber being treated with a conductive material.

Despite attempts by the prior art, a need remains for an inexpensive method for making electro-conductive substrates, wherein the anti-static material is affixed to the surface of the filament, fiber, or film for optimal performance.

SUMMARY OF THE INVENTION

The present invention is directed to electro-conductive substrates, and more specifically to a method of continuously extruding electro-conductive filaments and film comprising at least one metal powder, and the products thereof.

In accordance with the present invention, conventional continuous filament spinning technologies may be utilized, such as that disclosed in U.S. Pat. Nos. 4,041,203 and 3,338,992, both hereby incorporated by reference. Further, it has been contemplated that individually shaped die plates may be utilized, wherein the shaped plates are stacked in face to face juxtaposition. The single die plates exhibit a finite geometric relationship, which in turn provides resistance to flexural deformation of the individually shaped die plates and conversely, improved resistance to variability of the modular die unit and enhanced and predictable formation characteristics of the polymer material formed therewith. Each of said single die plates within the stack forming the modular die unit exhibit an x-direction, a y-direction, and a z-direction, wherein any one of said single die plates exhibit in said x-direction and y-direction to have at least a 50% planar continuity of the total planar continuity. The aforementioned stack plate die formation is disclosed in co-pending Ser. No. 60/462,054, and is hereby incorporated by reference.

The electro-conductive substrate of the present invention may comprise filaments extruded from a die orifice and at least one metal powder dispensed from a second orifice of the same die unit by way of a gas or liquid carrier. As the polymeric filament is extruded from the die, one or more metal powders may be simultaneously dispensed to coat the surface of the filament. As the polymeric melt and metal powder is extruded, air pressure is impinged upon the metal powder directing the powder toward the extruded filament. The metal powder adheres to the molten polymer as it is extruded for the die, coating the surface of the filament. The metal powder may also be incorporated into the polymeric melt prior to extrusion. Optionally, a vacuum system may be utilized to capture any excess metal powder that is dispensed into the surrounding environment. Further, the collected powder may be reloaded into the die in order to minimize waste.

In addition, the resultant metal coated filaments are activated with a corona discharge or exposure to a static bar, heat, plasma, ultrasound, or microwaves, wherein the activation treatment may affect the resultant fabric in full or only affect zones within the fabric. Further, the electro-conductive filaments may comprise homogeneous, bi-component, and/or multi-component profiles, performance modifying additives or agents, aesthetic modifying additives or agents, and the blends thereof. Further still, the filaments may be cut into finite staple lengths and utilized where electro-conductive staple fibers may be employed.

The electro-conductive filaments are extruded, collected, and consolidated into a nonwoven fabric, such as spunbond or meltblown fabric, exhibiting para-magnetic properties. The extruded filaments can be formed wherein the filaments show a cross-dimensional measure of less than 1.0 micron, hereinafter referred to as nano-denier fibers and filaments. Suitable nano-denier continuous filament layers can be formed by either direct spinning of nano-denier filaments or by formation of a multi-component filament that is subsequently divided into nano-denier filaments prior to deposition. U.S. Pat. Nos. 5,679,379 and 6,114,017, both incorporated herein by reference, exemplify direct spinning processes practicable in support of the present invention. Multi-component filament spinning with integrated division into nano-denier filaments can be practiced in accordance with the teachings of U.S. Pat. Nos. 5,225,018 and 5,783,503, both incorporated herein by reference. Subsequent to spinning and collecting the continuous filaments, the collected filaments may be subjected to entanglement by way of air pressure or hydraulic jets, as is disclosed U.S. Pat. No. 7,091,140, herein incorporated by reference.

In accordance with the present invention, incorporating one or more metal powders into a multi-component filament enhances the degree of division that occurs. It has been contemplated that exposing the metal containing filaments to ultrasound prior to mechanically impacting the filaments, such as by hydraulic jets, predisposes the filaments to splitting. Upon entanglement of the predisposed multi-component filaments, the degree of mechanical splitting that occurs is enhanced, providing the resultant nonwoven web with better filamentary coverage.

In addition to a nonwoven web, the polymeric melt may be extruded and collected as a film curtain, wherein the film may be cooled and wound as a roll good or directly extruded onto a secondary substrate. The electro-conductive film may be slit into ribbons or tapes that exhibit para-magnetic properties. The resultant film or tapes may be affected by chemical and/or mechanical post treatments or treated with an internal melt additive to achieve a desired end-use performance.

It has been contemplated that electro-conductive staple fibers can be formed by spinning a continuous tow of electro-conductive filaments and cutting the tow into finite lengths. Upon forming the finite staple fibers, the fibers may be carded, cross-lapped, or otherwise treated so as to achieve a desired end product. It has also been contemplated that the continuous tow of filaments or finite staple fiber be treated with various performance modifying topical agents and/or imparted with a crimp.

Other features and advantages of the present invention will become readily apparent from the following detailed description, the accompanying drawings, and the appended claims.

BREIF DESCRIPTION OF THE DRAWINGS

FIG. 4 is a diagrammatic representation of a die plate used in a method of the present invention; and FIG. 5 is a diagrammatic representation of die plate used in a method of the present invention.

DETAILED DESCRIPTION

While the present invention is susceptible of embodiment in various forms, there will hereinafter be described, presently preferred embodiments, with the understanding that the present disclosure is to be considered as an exemplification of the invention, and is not intended to limit the invention to the specific embodiments disclosed herein.

The present invention is directed to a method of making extruded electro-conductive substrates, including staple fiber substrates, filamentary substrate, film substrates and the combinations thereof. According to the present invention, the electro-conductive substrate comprises at least one metal powder, and may optionally include other topical and/or internal performance and aesthetic modifying additives. Electro-conductive substrates made in accordance with the present invention are comprised of a polymeric material that is extruded under heat and pressure. Suitable exemplary compounds that are rendered fluidic by application of heat include those polymers chosen from the group of thermoplastic polymers consisting of polyolefins, polyamides, and polyesters, wherein the polyolefins are chosen from the group consisting of polypropylene, polyethylene, and the combination and modifications thereof.

According to the present invention, the aforementioned polymeric material is extruded from the die unit, while a fine metallic powder is dispensed simultaneously from the same die unit by means of a liquid or gas carrier or otherwise by incorporating the powder into the polymeric melt. The metallic powder utilized in the present invention is a fine ferrous powder exhibiting a diameter less than 25 microns, which imparts a para-magnetic performance into the extruded substrate. Suitable techniques for manufacture of the powder utilized in the present invention are disclosed in U.S. Pat. Nos. 4,626,278 or 5,294,242, both hereby incorporated by reference.

Figure 1:
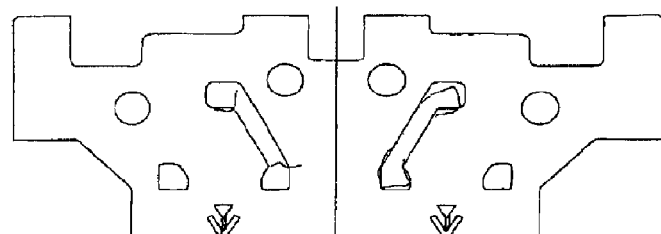
FIG. 1 is a diagrammatic representation of a die plate used in a method of the present invention.
Figure 2:
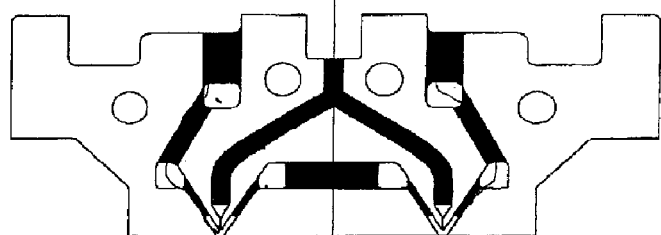
FIG. 2 is a diagrammatic representation of the FIG.1 die plate demonstrating an air extrusion path and a polymer extrusion path.
Figure 3:
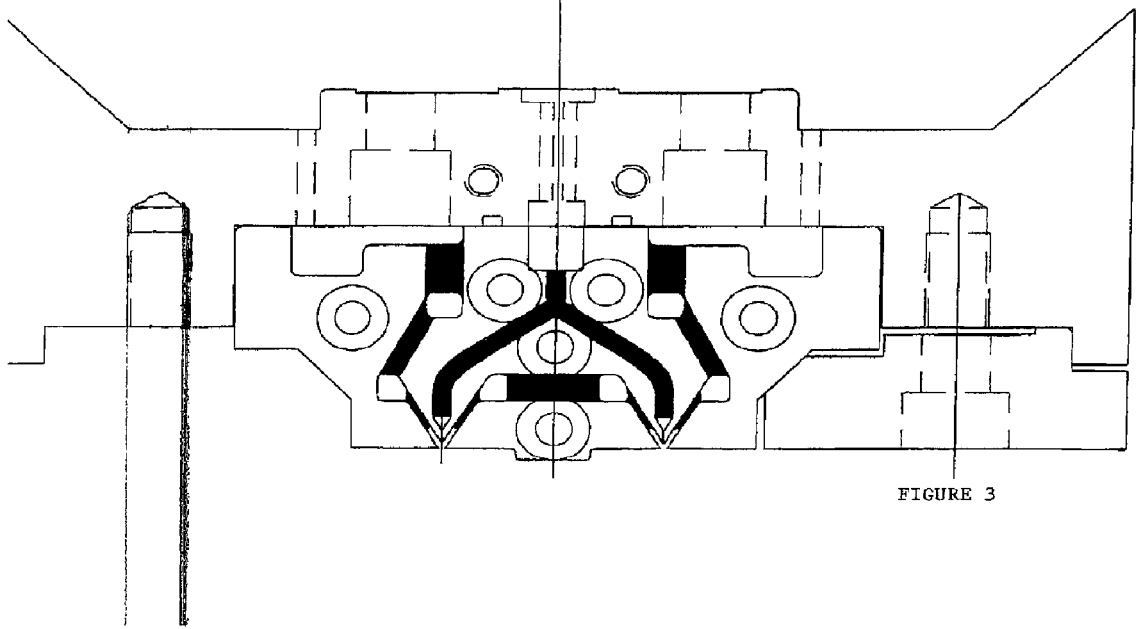
FIG. 3 is a diagrammatic representation of the FIG. 1 die plate in a modular die.

The die unit utilized in the present invention may include those conventional melt extrusion technologies, such as disclosed in U.S. Pat. No. 3,338,992, herein incorporated by reference, as well as the modular die unit disclosed in U.S. Ser. No. 60/462,054. As disclosed in U.S. Ser. No. 60/462,054 and shown in FIGS. 1-5, a stack plate die unit comprises a plurality of individually shaped plates wherein the shaped plates are stacked in face to face juxtaposition, and when placed into such a juxtaposition exhibit useful polymer forming attributes heretofore unattainable by prior art practices. Single die plates are formed such that the plates exhibit a finite geometric relationship, which in turn provides resistance to flexural deformation of the individually shaped die plates and conversely, improved resistance to variability of the modular die unit and enhanced and predictable formation characteristics of the polymer material formed therewith. Each of said single die plates within the stack forming the modular die unit exhibit an x-direction, a y-direction, and a z-direction, wherein any one of said single die plates exhibit in said x-direction and y-direction to have at least a 50% planar continuity of the total planar continuity.

The individually shaped die plates may comprise surface asperities, projections, voids and other deviations in planar geometry which allow for the shaped plates to adjust into specific relative orientation when one or more of such plates are placed into face to face juxtaposition. Further, combining the individually shaped die plates into a modular die unit can include the use of internal devices which extend through specified voids commonly defined in the die plates, external devices which cooperate with channels or other such keyways commonly defined in the die plates, external devices which extend about one or more surfaces defined by the stack of die plates, and the combinations thereof. The overall shape or geometry of the filaments or fibers of the present invention can include rectilinear, circular, cubic, rhombic, trapezoidal, cuboidal, and conical; however the overall shape of the filaments is not a limitation of the present invention.

Technologies capable of utilizing or otherwise incorporating modular die units include such examples as those which form continuous filament nonwoven fabrics, staple fiber nonwoven fabrics, continuous filament or staple fiber woven textiles (to include knits), and films. These technologies can utilize fluidic passageways defined in the combination of one or more individually shaped die plates comprising the modular die unit. The fluidic passageways can be employed in the expression of one or more fluidic, semi-fluidic, (or other such compounds and agents as can be rendered fluidic through application of heat and/or pressure) as well as particulates, colloidal suspensions, finite staple length natural and/or synthetic fibers, foams and gels. Fibers and/or filaments formed from a modular die in accordance with the present invention are selected from natural or synthetic composition, of homogeneous or mixed fiber length. Optionally, the shaped die plates can in combination simultaneously form one or more common extrusion gaps, and one or more continuous filament and/or fragmentary filament extrusion orifices. Suitable natural fibers include, but are not limited to, cotton, wood pulp and viscose rayon. Synthetic fibers, which may be blended in whole or part, include thermoplastic and thermoset polymers. Thermoplastic polymers suitable for use in the modular die include polyolefins, polyamides and polyesters. The thermoplastic polymers may be further selected from homopolymers; copolymers, conjugates and other derivatives including those thermoplastic polymers having incorporated melt additives or surface-active agents.

In general, continuous filament nonwoven fabric formation involves the practice of the spunbond process as described in U.S. Pat. No. 4,041,203, incorporated herein by reference. A spunbond process involves supplying a molten polymer, which is then extruded under pressure through a large number of orifices. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one die is used in line for the purpose of forming a multi-layered fabric, the subsequent webs are collected upon the uppermost surface of the previously formed web. The web is then at least temporarily consolidated, usually by means involving heat and pressure, such as by thermal point bonding. Using this means, the web or layers of webs are passed between two hot metal rolls, one of which has an embossed pattern to impart and achieve the desired degree of point bonding, usually on the order of 10 to 40 percent of the overall surface area being so bonded.

The extruded electro-conductive filaments may comprise homogeneous, bi-component, and/or multi-component profiles, performance modifying additives or agents, aesthetic modifying additives or agents, and the blends thereof. In accordance with the present invention, incorporating one or more metal powders into a multi-component filament enhances the degree of division that occurs. It has been contemplated that exposing the metal containing filaments to ultrasound prior to mechanically impacting the filaments, such as by hydraulic jets, predisposes the filaments to splitting. Upon entanglement of the predisposed multi-component filaments, the degree of mechanical splitting that occurs is enhanced, providing the resultant nonwoven web with better filamentary coverage.

A related means to the spunbond process for forming a layer of a nonwoven fabric is the meltblown process. Again, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first layer until the bonded web is wound into a roll. Methods for producing these types of fabrics are described in U.S. Pat. No. 4,041,203, previously incorporated by reference. The meltblown process, as well as the cross-sectional profile of the spunbond filament or meltblown microfiber, is not a critical limitation to the practice of the present invention.

According to the present invention, as the molten polymer is extruded through a first orifice of the die, a metallic powder or a blend of metallic powders is dispensed from a second orifice of the same die unit by way of a liquid or gas carrier. As the powder is dispensed from the die, air pressure is impinged upon the powder so as to coat the extruded filament with the powder. Optionally, a vacuum system may be utilized to capture any excess metal powder that is dispensed into the surrounding environment. Further, the collected powder may be reloaded into the die in order to minimize waste. It has also been contemplated that the metal powder may be incorporated directly into the polymeric melt. Once collected and consolidated as a nonwoven fabric the self-bonding electro-conductive filaments may be activated in whole or in part upon exposure to a corona discharge, static bar, plasma, heat, ultrasound, or microwave thereby imparting a para-magnetic performance into the fabric.

The extruded filaments of the present invention can be formed wherein the filaments exhibit a cross-dimensional measure of less than 1.0 micron, hereinafter referred to as nano-denier fibers and filaments. Suitable nano-denier continuous filament layers can be formed by either direct spinning of nano-denier filaments or by formation of a multi-component filament that is subsequently divided into nano-denier filaments prior to deposition. U.S. Pat. Nos. 5,679,379 and 6,114,017, both incorporated herein by reference, exemplify direct spinning processes practicable in support of the present invention. Multi-component filament spinning with integrated division into nano-denier filaments can be practiced in accordance with the teachings of U.S. Pat. Nos. 5,225,018 and 5,783,503, both incorporated herein by reference.

Optionally, the continuous extruded tow can be bundled, wrapped, twisted or braided into constructs of various dimensions. For example small bundles or twists can be formed into yarns used in the manufacture of woven and knit textiles. Multiple small bundles or twists can be subsequently integrated with other bundles or twists to form ropes of increasing physical capacity. It is also in the purview of the present invention that electro-conductive staple fibers can be formed by spinning a continuous tow of electro-conductive filaments. The continuous tow of filaments can be treated with various performance modifying topical agents and/or imparted with a crimp, and then cut into finite fiber lengths.

The collected electro-conductive substrate may be a filamentary substrate, staple fiber substrate, or film substrate. Extruded electro-conductive films may be mono-extruded, co-extruded, or multi-co-extruded. One or more electro-conductive substrates may be combined to form a laminate construct. Further, an electro-conductive substrate of the present invention may be combined with one or more non-electro-conductive substrates, wherein the additional layers may be selected from the group consisting of nonwovens, wovens, scrims, films, and the combinations thereof.

It's in the purview of the present invention that one or more of the fabric layers can be treated with various performance modifying topical agents. It has also been contemplated that the nonwoven fabric comprises one or more three-dimensional images, wherein the image is imparted by hydroentanglement on a foraminous surface or by extruding filaments directly onto a foraminous surface. Suitable foraminous surfaces include wire screens, perforated drums, open weave mesh, three-dimensionally surfaced belts, or a three-dimensional image transfer device.

The fabric of the present invention is suitable for various end-use applications where there is a need for an anti-static performance, such as a filtration component, upholstery cover fabric or dusting wipes utilized in specific areas that house electronic equipment, including computer manufacturing or storage facilities, information technology rooms, and electronic media rooms are deleteriously affected in the presence of static electricity. Further, the electro-conductive fabric may be utilized as a scrim material within a substrate so as to enhance the performance attributes of the substrate.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed is:

1. A method of making an electro-conductive fabric substrate comprising the steps of:
   providing a melt extrusion apparatus comprising at least a first and second orifice;
   providing at least one thermoplastic melt;
   providing at least one ferrous metal powder, wherein said ferrous metal powder has a diameter equal to or less than about 25 microns;
   providing an air source;
   extruding said thermoplastic melt through a first orifice of said apparatus forming continuous filaments having a surface, while simultaneously dispensing said ferrous metal powder through a second orifice of said apparatus, and impinging said ferrous metal powder with air so as to adhere to and coat the surface of said extruded filaments with said ferrous metal powder; and collecting and consolidating said filaments into said fabric substrate.

2. A method of making an electro-conductive fabric substrate as in claim 1, wherein said method incorporates a vacuum to collect excess powder.

3. A method of making an electro-conductive fabric substrate as in claim 1, wherein said filaments are activated by a corona discharge, static bar, plasma, heat, ultrasound, microwaves, or the combination thereof.

4. A method of making an electro-conductive fabric substrate as in claim 1, wherein said filaments are activated in whole or in part.

5. A method of making an electro-conductive fabric substrate as in claim 1, wherein said melt extrusion apparatus is a stack plate die unit.

6. A method of making an electro-conductive fabric substrate as in claim 1, where said filaments are deposited on a foraminous surface.

7. A method of making an electro-conductive fabric substrate as in claim 6, where said foraminous surface is an open weave mesh.

8. A method of making an electro-conductive fabric substrate as in claim 6, where said foraminous surface is a three-dimensional surface.

9. A method of making an electro-conductive fabric substrate as in claim 1, wherein said thermoplastic melt comprises a melt additive.

10. A method of making an electro-conductive fabric substrate as in claim 1, wherein said filaments have a diameter of less than or about 200 micrometers.

11. A method of making an electro-conductive fabric substrate as in claim 1, wherein said filaments have a diameter of less than or about 20 micrometers.

12. A method of making an electro-conductive fabric substrate as in claim 1, wherein said filaments have a diameter of less than or about 1.0 micrometers.

13. A method of making an electro-conductive fabric substrate as in claim 1, wherein said filaments are formed into a continuous tow.

14. A method of making an electro-conductive fabric substrate as in claim 1, wherein said filaments are coalesced into a nonwoven fabric.

15. A method of making an electro-conductive fabric substrate as in claim 1, wherein said filaments are woven into a textile product.

16. A method of making an electro-conductive nonwoven fabric comprising steps of:

providing a melt extrusion apparatus comprising at least a first and second orifice;

providing at least one thermoplastic melt;

providing at least one ferrous metal powder, wherein said ferrous metal powder has a diameter equal to or less than about 25 microns;

providing an air source;

extruding said thermoplastic melt through a first orifice of said apparatus forming continuous filaments having a surface, while simultaneously dispensing said ferrous metal powder through a second orifice of said apparatus, and impinging said ferrous metal powder with air so as to adhere to and coat the surface of said extruded filaments with said ferrous metal powder;

collecting and consolidating said filaments wherein said filaments are coalesced into a nonwoven fabric; and activating said filaments to impart a para-magnetic performance into the nonwoven fabric.

* * * * *